US011485407B2

(12) United States Patent
Briggs et al.

(10) Patent No.: US 11,485,407 B2
(45) Date of Patent: Nov. 1, 2022

(54) SMART ELECTRONIC POWER STEERING SYSTEM AND METHOD FOR A RETROFITTED ELECTRIC VEHICLE

(71) Applicant: Lightning Hybrids LLC, Loveland, CO (US)

(72) Inventors: William Briggs, Greeley, CO (US); Keith Lehmeier, Fort Collins, CO (US); Michael Corona, Fort Collins, CO (US)

(73) Assignee: Lightning Systems, Inc., Loveland, CO (US)

( * ) Notice: Subject to any disclaimer, the term of this patent is extended or adjusted under 35 U.S.C. 154(b) by 454 days.

(21) Appl. No.: 16/559,168

(22) Filed: Sep. 3, 2019

(65) Prior Publication Data

US 2020/0361516 A1 Nov. 19, 2020

Related U.S. Application Data

(60) Provisional application No. 62/848,775, filed on May 16, 2019.

(51) Int. Cl.
*B62D 5/04* (2006.01)
*H02P 6/06* (2006.01)
(Continued)

(52) U.S. Cl.
CPC .............. *B62D 5/046* (2013.01); *G05B 6/02* (2013.01); *G05D 7/0635* (2013.01);
(Continued)

(58) Field of Classification Search
CPC .................................................... B62D 5/046
See application file for complete search history.

(56) References Cited

U.S. PATENT DOCUMENTS 3,902,565 A 9/1975 Farrall
4,509,611 A 4/1985 Kade et al.
(Continued)

FOREIGN PATENT DOCUMENTS

CN 203439104 U 2/2014
CN 105667574 B 6/2016
(Continued)

OTHER PUBLICATIONS

Parker E-steering System for Hybrid & Full Electric Buses; Video; downloaded from the Internet on Aug. 22, 2019 at https://www.youtube.com/watch?v=FYv7OMZAEwo; published Sep. 26, 2017; 2 pages.

(Continued)

*Primary Examiner* — Michael A Berns
(74) *Attorney, Agent, or Firm* — Crowell Moring LLP

(57) ABSTRACT

A smart electronic power steering system and method for a retrofitted electric vehicle are provided. In one embodiment, an electronic power steering system comprises a relief valve; a pump in communication with the relief valve; a motor configured to operate the pump; a motor controller configured to control the motor; and a processor. The processor is configured to receive a desired maximum pressure value from a retrofitted electric vehicle and configure the relief valve or motor controller to provide relief at the desired maximum pressure value; and receive a desired flow rate from the retrofitted electric vehicle and configure the motor controller to operate the motor at a speed to achieve the desired flow rate. Other embodiments are provided.

22 Claims, 7 Drawing Sheets

(51) Int. Cl.
  *G05B 6/02* (2006.01)
  *G05D 7/06* (2006.01)
  *G07C 5/08* (2006.01)
  *B62D 15/02* (2006.01)

(52) U.S. Cl.
  CPC ......... *G05D 7/0676* (2013.01); *G05D 7/0688* (2013.01); *H02P 6/06* (2013.01); *B62D 15/029* (2013.01); *G07C 5/0808* (2013.01)

(56) References Cited

U.S. PATENT DOCUMENTS

| | | | |
|---|---|---|---|
| 6,631,782 B1 | 10/2003 | Rieger | |
| 6,681,165 B2 | 1/2004 | Shibasaki et al. | |
| 6,691,818 B2 | 2/2004 | Endo et al. | |
| 7,681,676 B2 * | 3/2010 | Kydd | B60K 6/48 180/65.21 |
| 7,963,197 B2 * | 6/2011 | Starko | B25B 13/48 81/177.2 |
| 8,150,579 B2 * | 4/2012 | Murty | B62D 5/063 701/41 |
| 8,204,634 B2 | 6/2012 | Schwarz et al. | |
| 8,960,357 B2 | 2/2015 | Maurer | |
| 8,991,535 B2 | 3/2015 | Grishashvili et al. | |
| 9,102,221 B1 | 8/2015 | Monfort et al. | |
| 9,248,854 B2 * | 2/2016 | Belshan | B62D 5/32 |
| 9,385,648 B2 | 7/2016 | Suzuki | |
| 9,694,811 B1 | 7/2017 | Lai | |
| 9,731,751 B2 * | 8/2017 | Kawamura | B62D 5/0463 |
| 9,831,814 B2 * | 11/2017 | Ajima | B60T 7/042 |
| 9,937,950 B2 | 4/2018 | Shiraki et al. | |
| 10,003,294 B2 | 6/2018 | Hara | |
| 10,183,698 B2 | 1/2019 | Ta et al. | |
| 10,286,949 B2 | 5/2019 | Sugawara et al. | |
| 10,710,855 B2 * | 7/2020 | Matsuo | B62D 5/065 |
| 10,800,446 B2 * | 10/2020 | Offerle | B62D 5/0481 |
| 10,875,569 B2 * | 12/2020 | Ko | B60W 30/18163 |
| 2006/0000650 A1 | 1/2006 | Hughey | |
| 2006/0101645 A1 | 5/2006 | Stone | |
| 2007/0169970 A1 | 7/2007 | Kydd | |
| 2010/0132516 A1 | 6/2010 | Starko | |
| 2016/0272237 A1 | 9/2016 | Kawamura | |
| 2017/0190354 A1 | 7/2017 | Ko | |
| 2020/0255054 A1 * | 8/2020 | Friedel | H02P 6/085 |
| 2020/0361516 A1 * | 11/2020 | Briggs | G05D 7/0676 |

FOREIGN PATENT DOCUMENTS

| | | |
|---|---|---|
| CN | 105946966 A | 9/2016 |
| CN | 107878557 A | 4/2018 |
| CN | 207895314 U | 9/2018 |
| CN | 108715185 A | 10/2018 |
| DE | 20 2012 002 541 U | 8/2013 |
| EP | 3 045 334 B1 | 7/2016 |
| TW | I 367840 B | 7/2012 |

OTHER PUBLICATIONS

"Parker's E-steering offers greater efficiency in commercial vehicle applications"; downloaded from the Internet on Aug. 22, 2019 at https://www.parker.com/ortal/site/PARKER/menuitem. 7322a3ce19c3a730b5170b0d237a; published Dec. 6, 2016; 3 pages.

"Kits"; webpage from EV-Propulsion "The EV Conversionists" Quality Electric Vehicle Conversions and Quality website under conversion-KITS; Aug. 2, 2019; 3 pages.

Ecotuned Automobile—Electric Conversion Presentation; from website Ecotuned.com; Mar. 2019; 10 pages.

Fan, Chang-sheng et al.; "Design of the Auto Electric Power Steering System Controller"; Procedia Engineering, vol. 29; 2012; pp. 3200-3206.

Hu, Chun-hua; "Modeling and Simulation of Automotive Electric Power Steering System"; Second International Symposium on Intelligent Information Technology Application; IEEE Computer Society; 2008; pp. 436-439.

Jiang, Haobin et al.; "Research on Control of Intelligent Vehicle Human-Simulated Steering System Based on HSIC"; Applied Sciences; Jan. 2019; 905; 15 pages.

Shriwastava, R.G. et al.; "Electric Power Steering with Permanent Magnet Synchronous Motor Drive Used in Automotive Application"; IEEE—1$^{st}$ International Conference on Electrical Energy Systems; 2011; pp. 145-148.

Soltani, Amir et al.; "A Hardware-in-the-Loop Facility for Integrated Vehicle Dynamics Control System Design and Validation"; 2016; IFAC—PapersOnLine 49-21; pp. 32-38.

Wu, Hairong et al.; "EPS Current Tracking Method Research Based on Hybrid Sensitivity H∞ Control Algorithm"; Journal of Electric and Computer Engineering, vol. 2018, Article ID 2156980; 10 pages.

* cited by examiner

SMART ELECTRONIC POWER STEERING SYSTEM AND METHOD FOR A RETROFITTED ELECTRIC VEHICLE

CROSS-REFERENCE TO RELATED APPLICATION

This application claims the benefit of U.S. Patent Application No. 62/848,775, filed May 16, 2019, which is hereby incorporated by reference.

BACKGROUND

Electronic power steering systems are not generally common between vehicle platforms. Different vehicles have different requirements for flow and pressure. These different requirements require the vehicle integrator to spec components to meet those requirements while the overall system architecture remains mostly unchanged.

DETAILED DESCRIPTION

Introduction

Figure 1A:
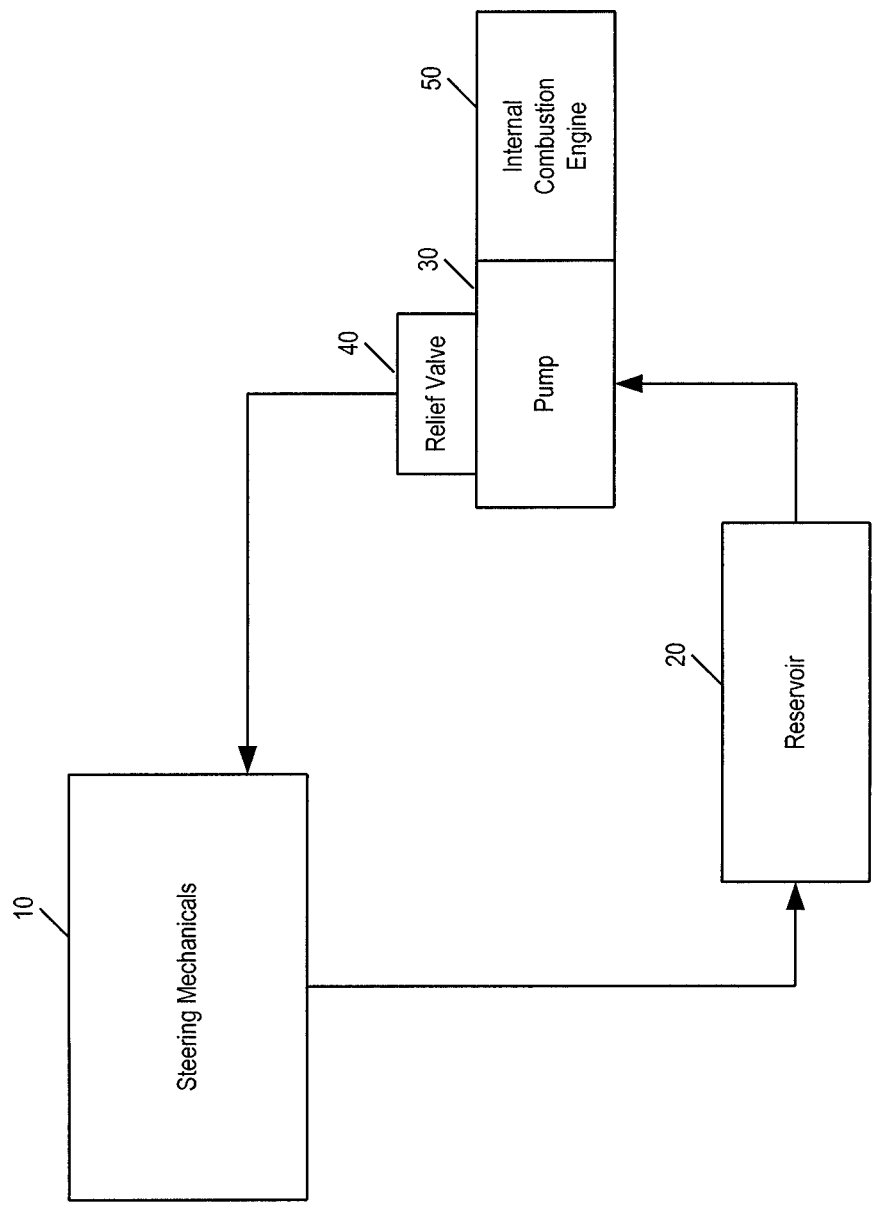
FIG. 1A is a block diagram of a prior art power steering system in a vehicle with an internal combustion engine.

The following embodiments provide a smart electronic power steering system and method for a retrofitted electric vehicle. As mentioned above, electronic power steering systems are not generally common between vehicle platforms (e.g., commercial internal combustion engine (ICE) vehicles). Different vehicles have different requirements for flow and pressure. So, when designing electric vehicles or electric vehicle retrofits, most power steering gears or racks will have different requirements for nominal flow and maximum pressure. These different requirements require the vehicle integrator to spec components to meet those requirements while the overall system architecture remains mostly unchanged. This may mean that a new system with new hardware and controls has to be developed on each new platform to meet these requirements. Additionally, these systems have inefficiencies in that to meet the nominal flow, a flow control valve has to be implemented so that when the pump speed (engine speed) is above the proper pump speed, some flow is bypassed and energy is lost. Others have created electronic power steering solutions, but they generally do not abstract the interface to the ideal level. For controlling flow, it is generally required to know the relationship between motor speed and pressure to flow, and pressure relief is done with a hardware setting (valve).

In the following embodiments, an entire system is provided that would remain common across platforms, and the vehicle interface only requires changing the flow and pressure commands to the smart steering system. There are many alternatives that can be used with these embodiments. For example, the electric motor does not need to be a high voltage motor. Also, the motor controller and electric motor could be a combined unit. There are many advantages associated with these embodiments. For example, these embodiments can provide a better solution because the same system can be used in applications with varying requirements.

Other possible advantages/features may include the following: a system that provides a hydraulic source in vehicles that use hydraulic power steering; a system that acts as a hydraulic source for brakes in vehicles that use hydraulic brakes; a system that is adaptable to work on vehicles with varying pressure requirements; a system that is adaptable to work on vehicles with varying flow requirements; a system that is adaptable to work on vehicles with varying input voltage requirements; a system that is adaptable to work on vehicles with varying control requirements; a system that is designed such that a request is made for a certain pressure and flow command and speed and valve settings are adjusted to meet the command. Further, with these embodiments, power steering can be maintained with the traction system inactive, unlike conventional power steering systems.

It should be noted that these embodiments can be used with both commercial and non-commercial vehicles. As used herein, a "commercial vehicle" refers to a vehicle used for transporting goods or paying passengers. A commercial vehicle may have a different construction and different equipment than a non-commercial vehicle.

Example Embodiments

Turning now to the drawings, FIG. 1A is a block diagram of a prior art power steering system in a vehicle with an internal combustion engine 50. As shown in FIG. 1A, the internal combustion engine (ICE) 50 powers a power steering pump 30, which pumps power steering fluid from a reservoir 20 to steering mechanicals 10. In this architecture, the power steering pump 30 is driven directly off the internal combustion engine 50, which is directly attached to the power steering pump 30. The steering mechanicals 10 can comprise a hydraulic steering rack or gear that turns the tires. Power steering fluid flows through the steering mechanicals 10 back to the reservoir 20 and then back to the pump 30. Typically, the internal combustion engine 50 of the vehicle drives the power steering pump 30 at a constant flow rate. A relief valve 40 is used to provide pressure relief if the pressure of the power steering fluid exceeds a maximum pressure limit. A flow controller can also be used to control the flow.

While FIG. 1A shows an architecture for a gasoline-powered vehicle, recently, there has been a desire for electric vehicles. As used herein, an "electric vehicle" (EV) refers to a vehicle (e.g., car, truck, bus, etc.) that uses an electric motor powered by a battery as its primary propulsion unit. While a vehicle can be built as an electric vehicle by a manufacturer, an existing gasoline-powered vehicle with an internal combustion engine (ICE) can be retrofitted to be an electric vehicle. In such a conversion, the vehicle's ICE would be removed and replaced with an electric motor and battery. Some other existing components can be removed as well (e.g., the fuel tank and exhaust system), while other existing components can remain (e.g., power steering mechanicals and the power steering fluid reservoir).

Figure 1B:
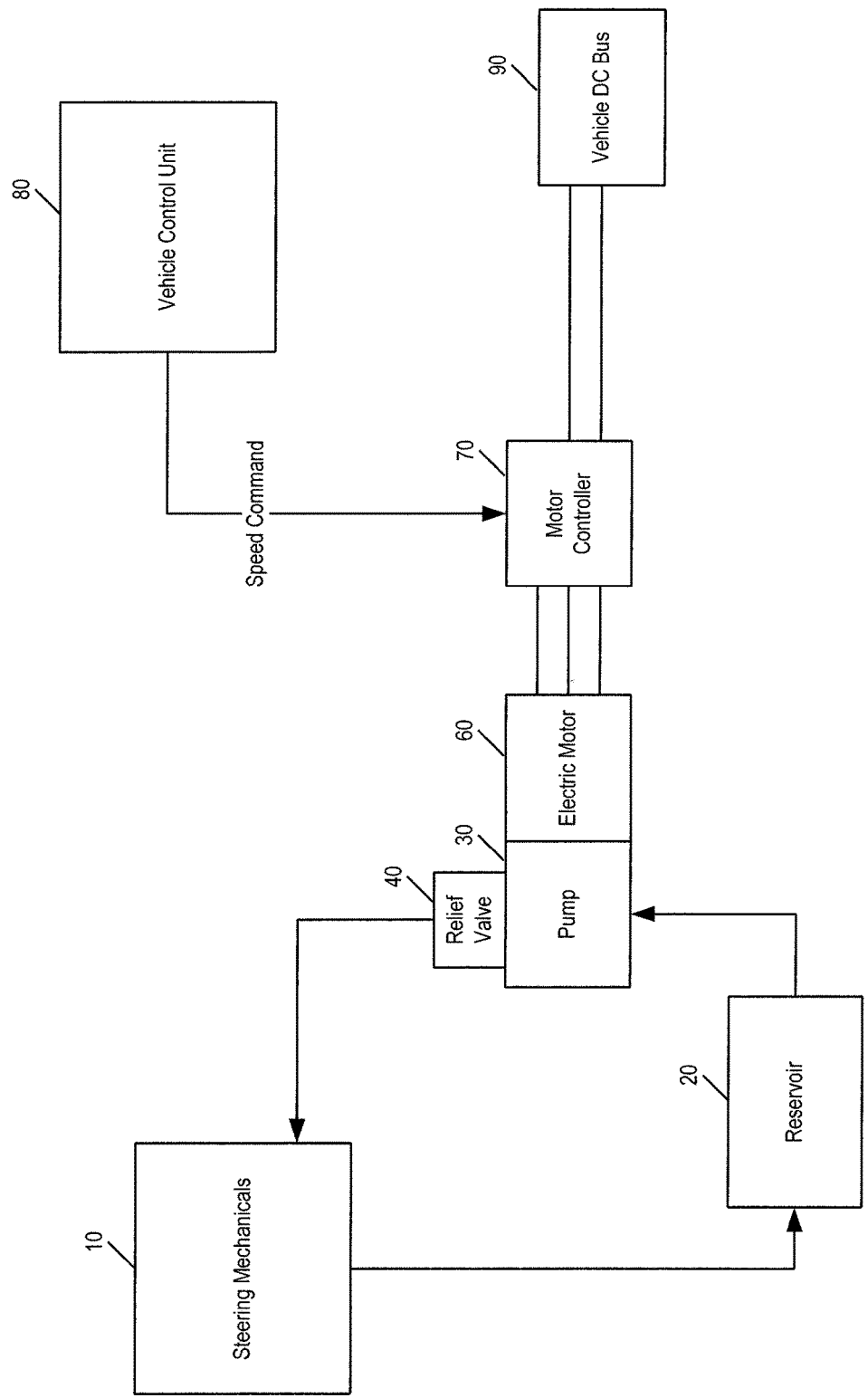
FIG. 1B is a block diagram of a prior art power steering system in a retrofitted electric vehicle.

FIG. 1B is a block diagram of a prior art power steering system in a retrofitted electric vehicle. As shown in FIG. 1B, the internal combustion engine 50 shown in FIG. 1A has been removed and replaced by an electric motor 60, a motor controller 70, a vehicle control unit 80, and a vehicle DC bus 90. The steering mechanicals 10, power steering fluid reservoir 20, and relief valve 40 remain. The existing steering mechanics 10 and reservoir 20 require a certain flow rate, and the relief valve 40 needs to be set at a certain maximum pressure limit. Different vehicles can have different required flow rates and maximum pressure limits (e.g., due to different wheel diameters and/or steering rack). For example, a Class 3 truck can require 20 liters of fluid per minute and no more than 1,000 pounds per square inch (PSI) of pressure, whereas a Class 6 truck can require 50 liters of fluid per minute and no more than 1,500 PSI of pressure. Because of these differences between platforms, during the retrofit process, someone would need to determine what the flow rate and maximum pressure limit values are for the vehicle and then determine how to manually configure the relief valve 40 for the maximum pressure value and then program the vehicle control unit 80 (e.g., processor) to command the motor controller 70 to operate at a certain speed in order to achieve the required flow rate. That is, the relationship between the motor speed and flow needs to be known, and the relief valve 40 needs to be mechanically set. This can be a slow, tedious, and potentially error-prone process. Further, typically, electric power steering pumps are sized for a single application and are not easily changed to work for other applications. Additionally, they are sized to meet the flow requirements at idle, so operating speeds above idle represent inefficiencies.

The following embodiments can be used to overcome these problems. More particularly, the following embodiments provide an electric power steering system that automatically determines the flow rate and maximum pressure limit values that are appropriate for the vehicle and then automatically configures the relief valve and motor/motor controller accordingly. This provides a modular, smart "plug-and-play" system that can be used to retrofit any number of different vehicle platforms. That is, this embodiment provides a "one-size-fits-all" system that abstracts its interface to the vehicle to two input values (flow rate and maximum pressure), allowing the same system to be easily used in a variety of different types of vehicles. Further, in contrast to the prior art retrofitted vehicles where the relationship between the motor speed and flow needs to be known by the vehicle control unit and the relief valve needs to be mechanically set, in this embodiment, the vehicle control unit 200 only needs to request the desired flow and pressure. The EPS system 100 is capable of a wide range of flow and pressures, so the same EPS system 100 can be used on multiple platforms with only minor changes to the vehicle level controls.

Figure 2:
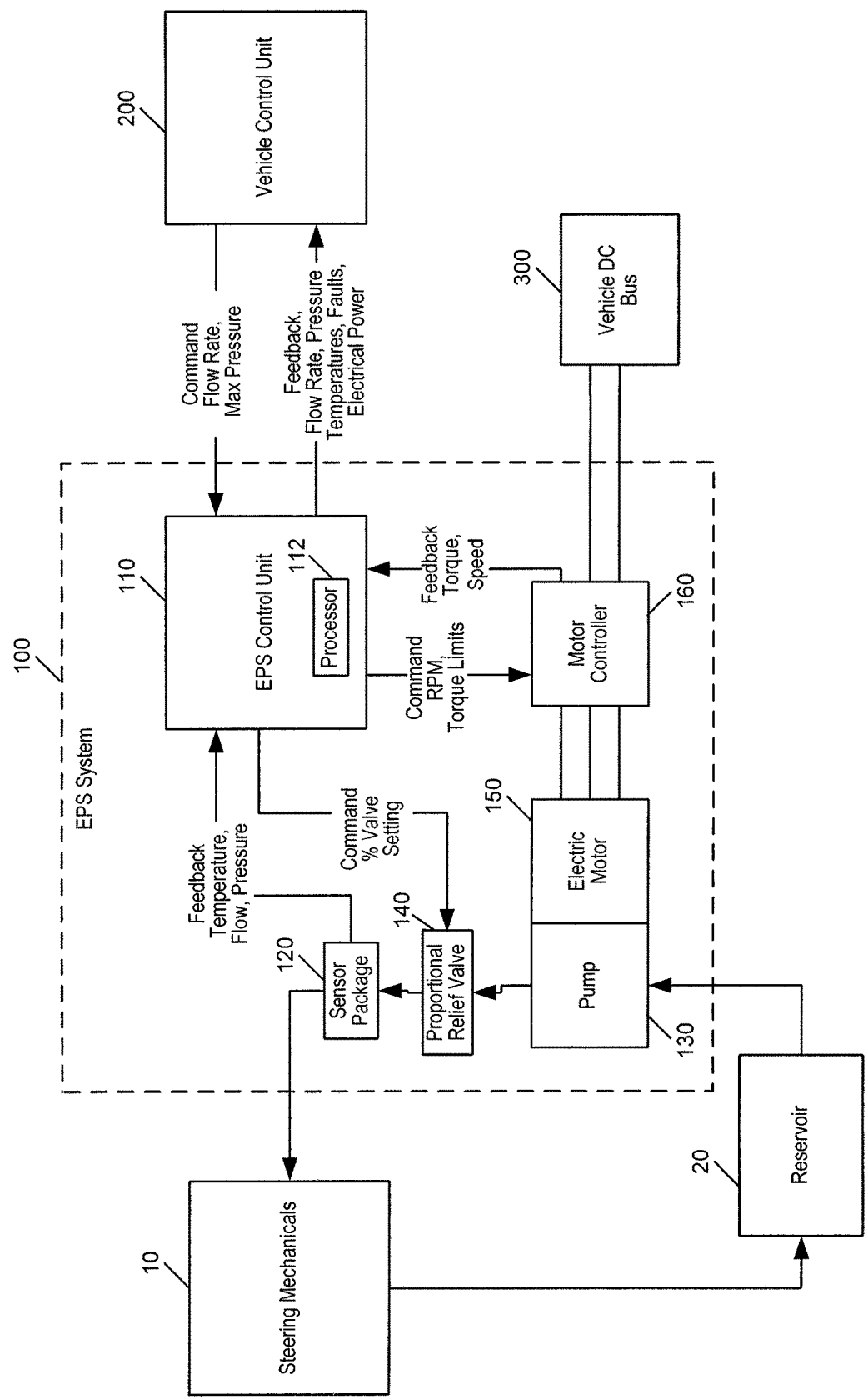
FIG. 2 is a block diagram of a retrofitted electric vehicle having an electronic power steering system of an embodiment.

Turning again to the drawings, FIG. 2 is a block diagram of a retrofitted electric vehicle with an electronic power steering (EPS) system 100 of an embodiment. As shown in FIG. 2, in this embodiment, the EPS system 100 is in communication with steering mechanicals 10 and a power steering fluid reservoir 20, which are legacy components of the vehicle in this embodiment, as well as a vehicle control unit 200 and vehicle direct current (DC) bus 300, which are components added to the vehicle in the retrofit in this embodiment. As also shown in FIG. 2, the EPS system 100 in this embodiment comprises an EPS control unit 110 (e.g., having a processor 112), a sensor package 120 with one or more sensors (e.g., a temperature sensor and/or a pressure sensor), a (hydraulic) power steering pump 130 with a proportional relief valve 140 (i.e., a continuously adjustable relief valve that limits the output pressure depending on the electrical current applied to it), an electric motor 150 that operates the power steering pump 130, and a motor controller 160 that controls the electric motor 150. Any suitable type of motor can be used, such as, but not limited to, a single-phase motor, a three-phrase motor, and a DC brush or brushless motor. The various components in the EPS system 100 can communicate control information over a network (e.g., a controller area network (CAN) bus).

While shown as separate boxes in FIG. 2 and listed separately herein, it should be understood that the motor controller 160 and electric motor 150 can be combined together. Accordingly, when it is said that the system 100 comprises a motor controller 160 and an electric motor 150, it should be understood that the motor controller 160 and electric motor 150 can be a single, integrated component, even though the motor controller 160 and electric motor 150 are listed separately.

As mentioned above, in prior retrofit approaches, someone would look-up the flow rate and maximum pressure settings for the vehicle undergoing the retrofit and manually calculate the required motor speed and relief valve setting. Then the vehicle control unit would be configured accordingly. This can be a slow, tedious, and potentially error-prone process. In contrast, the EPS system 100 of this embodiment uses the EPS control unit 110 to automate the process. In particular, the EPS control unit 110 in this embodiment receives the flow rate and maximum pressure setting values for the vehicle from the vehicle control unit and turns these commands into the proper motor control and valve control, as opposed to the vehicle control unit making those commands directly. For example, as part of the retrofit process, the vehicle can be installed with a vehicle control unit 200, which provides the flow rate and maximum pressure setting values to the EPS control unit 110 at any appropriate time/time interval. For example, the vehicle control unit 200 can provide the flow rate and/or maximum pressure value the first time the vehicle is started, every time the vehicle is started, when the EPS control unit 110 is initially connected to the vehicle control unit 200, etc. The vehicle control unit 200 can be configured to provide the EPS control unit 110 with the flow rate and/or maximum pressure values in any suitable way. For example, in one embodiment, the vehicle control unit 200 comprises a memory that stores the flow rate and/or maximum pressure values, and the EPS control unit 110 can simply read that data out of the memory. In another embodiment, the vehicle control unit 200 further comprises a processor that commands the processor of the EPS control unit 110 to use specified flow rate and maximum pressure values for configuring the EPS system 100. The vehicle control unit 200 can comprises additional functionality. For example, in one embodiment, the vehicle control unit 200 can control other components of the electric vehicle.

The EPS control unit 110 knows the relationship between motor speed and pressure to flow so the EPS control unit 110 can convert the desired flow rate and maximum pressure values to configuration values appropriate for the proportional relief valve 140 and motor 150 (e.g., using a formula, look-up table, or other technique). So, after receiving the desired flow rate and maximum pressure settings from the vehicle control unit 200, the EPS control unit 100 determines how to configure the proportional relief valve 140 and motor controller 160 to achieve the desired flow rate and maximum pressure values.

Figure 3:
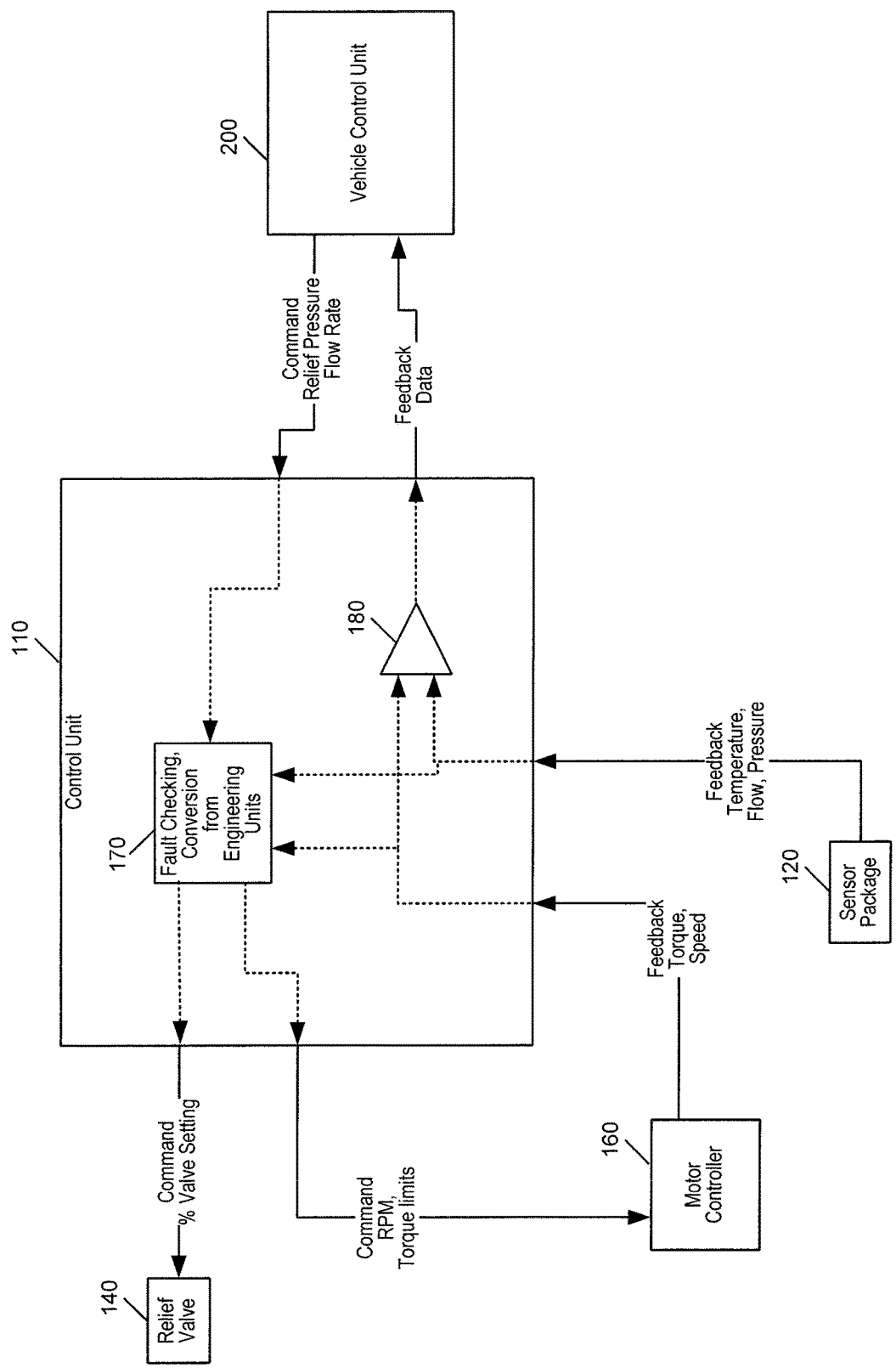
FIG. 3 is another block diagram of a retrofitted electric vehicle having an electronic power steering system of an embodiment.
Figure 4:
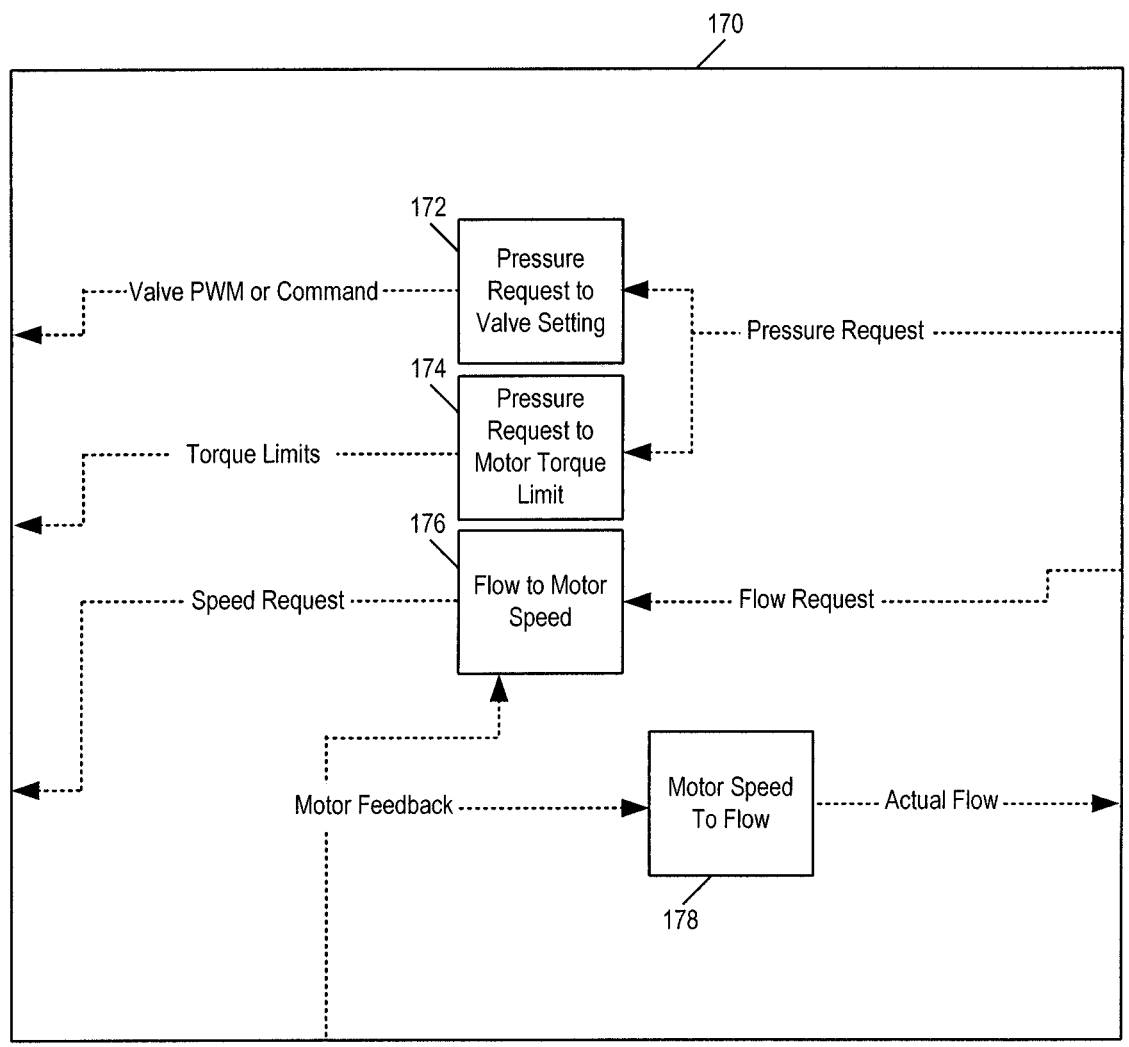
FIG. 4 is a block diagram of a module of a control unit of an embodiment.

For example, as shown in FIG. 3, the EPS control unit 100 can have a module 170 for fault checking and converting engineering units. As shown in more detail in FIG. 4, that module 170 can include a module 172 that converts a pressure request to a valve setting (e.g. a pulse width modulation (PWM) value or command), a module 174 that converts a pressure request to a torque limit, a module 176 that converts a flow rate to a motor speed, and a module 178 that converts a motor speed to an actual flow rate (for feedback purposes, which will be discussed below). So, based on the displacement of the pump (or feedback from a flow meter), the EPS control unit 100 can set the pump speed and valve command (if an electro-proportional valve) to achieve the desired flows and pressure relief. If the relief valve is not electro-proportional, the valve can be mechanically set.

Figure 5:
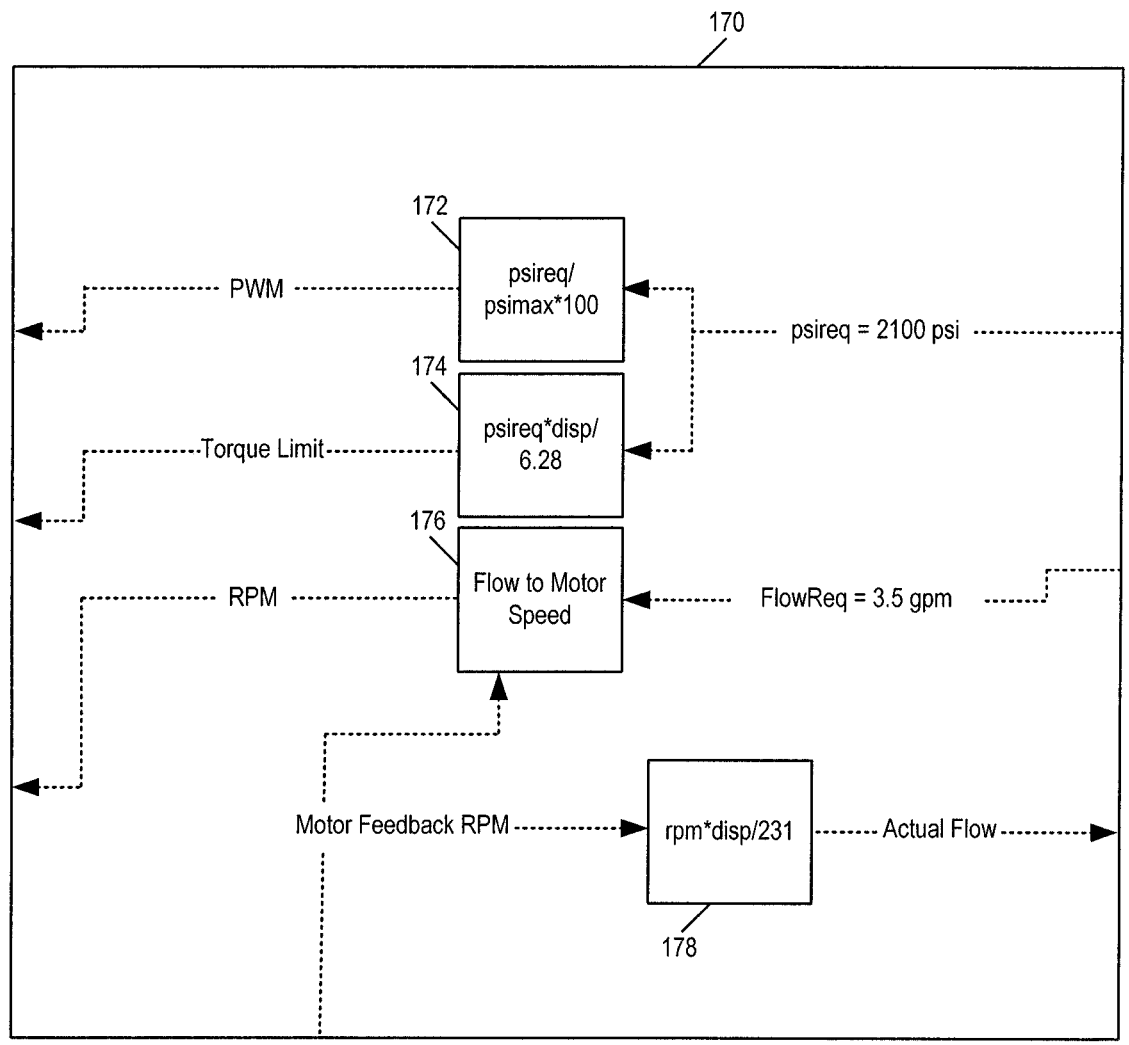
FIG. 5 is a block diagram of one implementation of a module of a control unit of an embodiment.

FIG. 5 is an example of one particular implementation of those modules. As shown in FIG. 5, when module 170 receives a maximum pressure request (here, 2,100 pounds per square inch (psi)) from the vehicle control unit 200, module 172 divides that requested psi by 100*the maximum psi of the proportional relief valve 140. The result is a pulse-width-modulated (PWM) value that can be sent to the proportional relief valve 140 to set the valve 140 to open when the maximum pressure is reached. Module 174 also uses the maximum pressure request, but it uses it to calculate a torque limit on the electric motor 150 (by multiplying the maximum pressure request by the motor displacement and dividing by 6.28).

Module 176 takes the flow rate (here, 3.5 gallons per minute (gpm)) received from the vehicle control unit 200 and calculates the revolutions per minute (RPM) needed by the motor 150 to achieve the desired flow rate. As shown in FIG. 5, module 176 can do this in this example by multiplying the desired flow rate by 231 and dividing by the motor displacement. On the motor feedback side (which will be discussed further below), module 178 takes the actual RPM of the motor 160, multiplies it by the motor displacement, and then divides by 231 to provide an actual flow rate.

Returning to FIG. 2, after the EPS control unit 110 calculates the values needed to achieve the desired flow rate and maximum pressure, the EPS control unit 110 configures the proportional relief valve 140 and motor controller 160 with those values. For example, as shown in FIG. 2, to achieve the desired flow rate, the EPS control unit 110 can send a command to the motor controller 160 to program it for the calculated RPM, which would cause the electric motor 150 to operate the pump 130 with the appropriate number of RPMs to cause the flow of power steering fluid to reach the desired flow rate. Further, to achieve the desired maximum pressure setting, the EPS control unit 110 can send a command to the proportional relief valve 140 with the appropriate percentage (e.g., when the proportional relief valve 140 is an electro-proportional relief valve). Alternatively, the EPS control unit 110 can command the motor controller 160 to operate under a calculated torque limit, which would ensure that the pressure does not exceed the maximum pressure value.

After the settings have been received, the EPS system 100 can provide feedback information to the EPS control unit 110 to ensure that the system 100 is actually operating under the desired flow rate and maximum pressure values. For example, one or more sensors in the sensor package 120 can monitor actual temperature, flow rate, and pressure and provide that feedback information to the EPS control unit 110. If the feedback information indicates that the actual maximum pressure setting differs from the desired maximum pressure setting, the EPS control unit 110 can make the appropriate adjustments. Further, as the algorithm used by the EPS control unit 110 to determined RPM, valve settings, and/or torque can be dependent on temperature and pressures, the EPS control unit 110 can use the temperature and/or pressure feedback information from the sensor package 120 to make whatever adjustments are needed based on the temperature and pressure. Additionally, the temperature and/or pressure readings can be used as a fault checking measure (e.g., if the temperature indicates overheating, the system 100 may be working too hard because the proportional relief valve 140 failed).

As another example, the motor controller 160 can provide the actual motor torque and speed to the EPS control unit 110. If that feedback information indicates that the actual flow rate differs from the desired flow rate (e.g., due to environmental conditions, the age of the motor 150, leakage in the pump 130 and/or proportional relief valve 140), the EPS control unit 110 can make the appropriate adjustments to its outputs. Further, the EPS control unit 110 can send feedback information (e.g., flow rate, pressure, temperature, faults, electric power issues, etc.) to the vehicle control unit 200 (e.g., using the combiner 180 in FIG. 3). The vehicle control unit 200 can take some action based on this feedback information. For example, if the vehicle's upper limit on temperature has been reached or if the actual flow of only half of what was desired, the vehicle control unit 200 can determine to de-rate the request values, shut off the electric motor 150, or note the fault and take no other action. As another example, feedback could be provided to the driver, such as through a malfunction indicator light.

Figure 6:
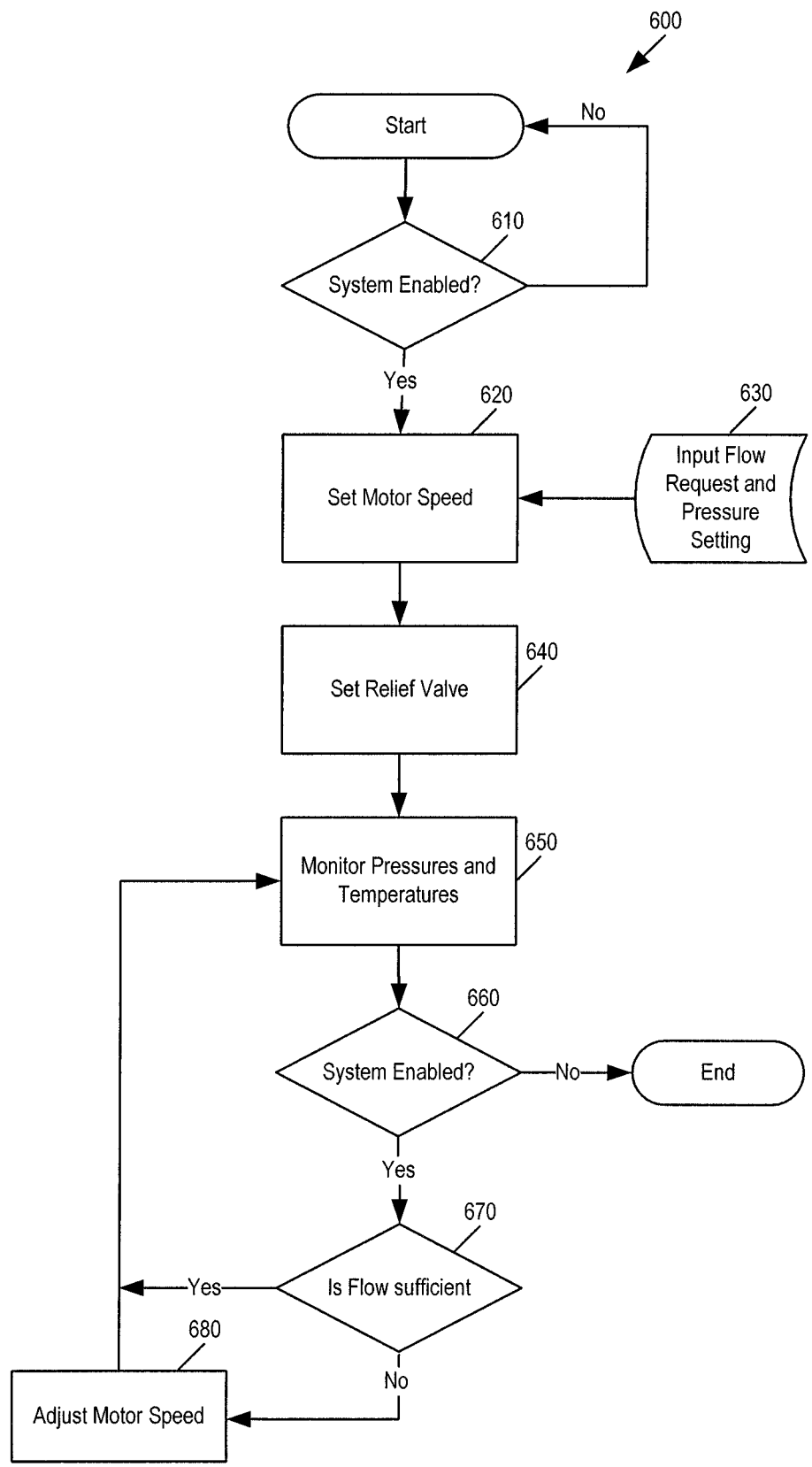
FIG. 6 is a flow chart of a method of an embodiment for using a smart electronic power steering system in a retrofitted electric vehicle.

Returning to the drawings, FIG. 6 is a flow chart 600 of a method of an embodiment for using a smart electronic power steering system 100 in a retrofitted electric vehicle. This method can be performed in a processor 112, such as in the EPS control unit 110. As shown in FIG. 6, the processor 112 determines if the system 100 is enabled (610). For example, the system 100 may be enabled when the vehicle is in "drive" but not "park," or the system 100 may be disabled based on a fault (e.g., during a fire or after a crash). When the processor 112 determines if the system 100 is enabled, the processor 112 sets the motor speed (620) and the proportional relief valve 140 based on the input flow request and pressure setting (630). The processor 112 monitors the actual pressure and temperatures (650). If the system 100 is still enabled (660) (e.g., if the vehicle is still in "drive"), the processor 112 determines if the flow is sufficient (670). If it is, the processor 112 continues the monitor process. However, if it is not, the processor 12 adjusts that motor speed accordingly (680).

In general, the functionality of these embodiments can be provided by one or more controllers or processors that are configured to implement the algorithms shown in the attached drawings and described herein. As used herein, a controller or processor can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. Additionally, the phrase "in communication with" could mean directly in communication with or indirectly (wired or wireless) in communication with through one or more components, which may or may not be shown or described herein. The term "module" may also be used herein. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. An electronic power steering system for a retrofitted electric vehicle, the electronic power steering system comprising:
    a relief valve;
    a pump in communication with the relief valve;
    a motor configured to operate the pump;
    a motor controller configured to control the motor; and
    a processor in communication with the relief valve and motor controller, wherein the processor is configured to:
        receive a desired maximum pressure value from the retrofitted electric vehicle and configure the relief valve or motor controller to provide relief at the desired maximum pressure value; and
        receive a desired flow rate from the retrofitted electric vehicle and configure the motor controller to operate the motor at a speed to achieve the desired flow rate.

2. The electronic power steering system of claim 1, wherein the processor is configured to:
    calculate how many revolutions-per-minute of the motor are required to provide the desired flow rate; and
    configure the motor controller to operate the motor at the calculated revolutions-per-minute.

3. The electronic power steering system of claim 1, wherein the processor is configured to:
    calculate a relief valve setting required to provide the desired maximum pressure value; and
    configure the relief valve with the calculated relief valve setting.

4. The electronic power steering system of claim 1, wherein the processor is configured to:
    calculate a torque limit of the motor required to provide the desired maximum pressure value; and
    configure the motor controller to operate the motor under the calculated torque limit.

5. The electronic power steering system of claim 1, wherein the processor is configured to receive feedback and reconfigure the relief valve and/or motor controller in response to the feedback.

6. The electronic power steering system of claim 5, wherein the feedback comprises one or more of temperature, flow rate, and pressure from at least one sensor.

7. The electronic power steering system of claim 5, wherein the feedback comprises one or more of feedback torque and speed from the motor controller.

8. The electronic power steering system of claim 5, wherein the processor is further configured to provide the feedback to a second processor in the retrofitted electric vehicle.

9. The electronic power steering system of claim 8, wherein the vehicle control unit is configured to provide the feedback to a driver of the retrofitted electric vehicle.

10. The electronic power steering system of claim 1, wherein the retrofitted electric vehicle comprises a commercial vehicle.

11. A method for use in an electric vehicle, the method comprising:
    performing the following in an electronic power steering system in the electric vehicle:
        receiving a maximum pressure value and a flow rate from the electric vehicle;
        converting the maximum pressure value and the flow rate into power steering component settings; and
        configuring power steering components with the power steering component settings.

12. The method of claim 11, wherein converting the maximum pressure value and the flow rate into power steering component settings comprises:
    calculating how many revolutions-per-minute of a motor are required to provide the flow rate; and
    calculating a relief valve setting required to provide the maximum pressure value.

13. The method of claim 11, wherein converting the maximum pressure value and the flow rate into power steering component settings comprises:
    calculating how many revolutions-per-minute of a motor are required to provide the flow rate; and
    calculating a torque limit of the motor required to provide the maximum pressure value.

14. The method of claim 11, further comprising:
    receiving feedback and reconfiguring a relief valve and/or motor controller in response to the feedback.

15. The method of claim 14, wherein the feedback comprises one or more of temperature, flow rate, and pressure from at least one sensor.

16. The method of claim 14, wherein the feedback comprises one or more of feedback torque and speed from the motor controller.

17. The method of claim 14, further comprising providing the feedback to a second processor in the electric vehicle.

18. An electronic power steering system comprising:
    an input configured to receive a maximum pressure value and a flow rate from a vehicle; and
    a processor configured to command a motor and a relief valve of the vehicle to achieve the maximum pressure value and flow rate based on the maximum pressure value and flow rate received from the vehicle.

19. The electronic power steering system of claim 18, wherein the processor is further configured with relationships between motor speed and flow rates for a plurality of vehicle platforms.

20. The electronic power steering system of claim 18, wherein the processor is configured to calculate how many revolutions-per-minute of the motor are required to provide the flow rate.

21. The electronic power steering system of claim 18, wherein the processor is configuring to calculate a relief valve setting required to provide the maximum pressure value.

22. The electronic power steering system of claim 18, wherein the processor is configured to calculate a torque limit of the motor required to provide the maximum pressure value.

* * * * *